Aug. 21, 1934.  A. MARX ET AL  1,970,810
PLANER
Filed Sept. 13, 1932  4 Sheets-Sheet 3
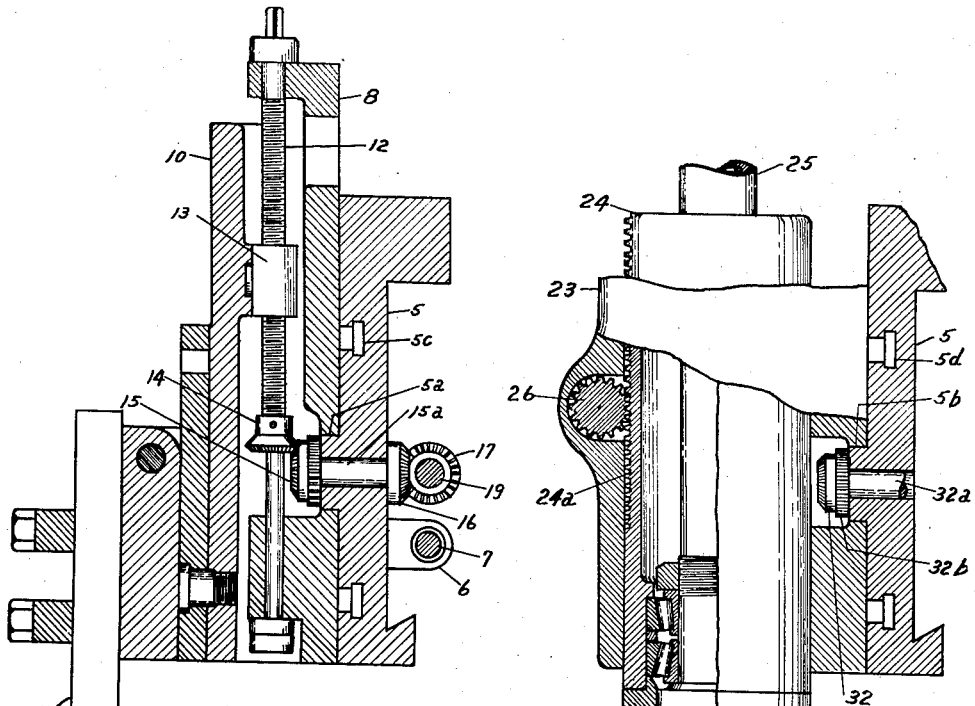
Fig. 5
Fig. 7
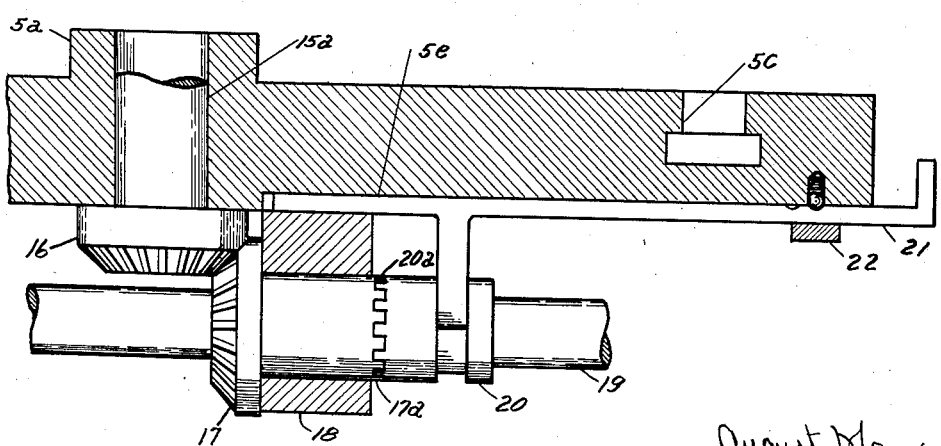
Fig. 6
August Marx
Howard W. Hunt
INVENTORS.

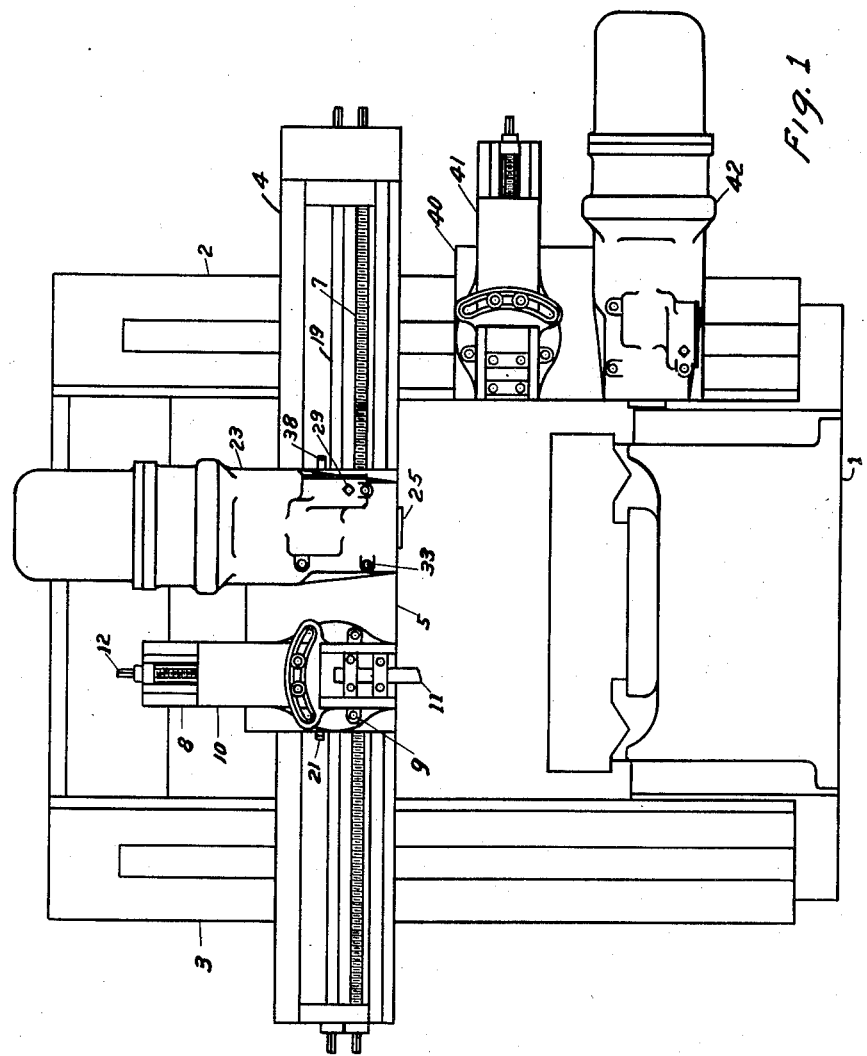

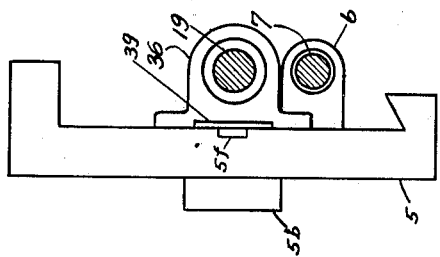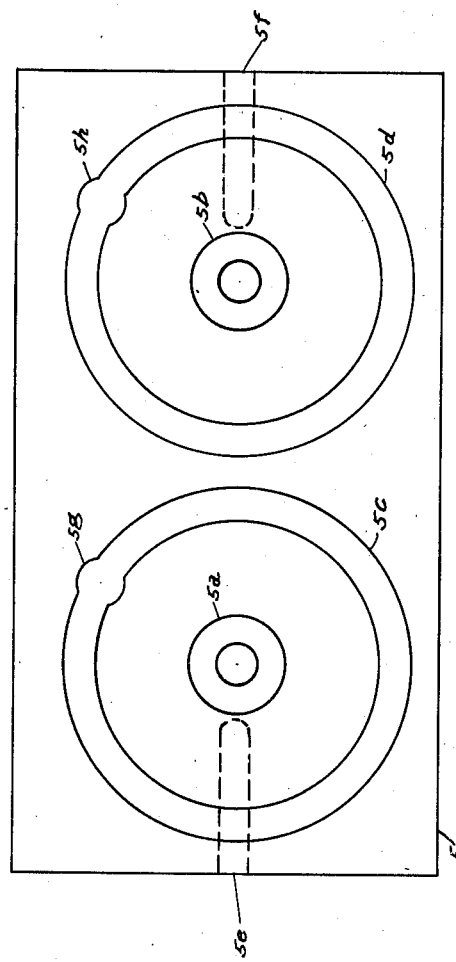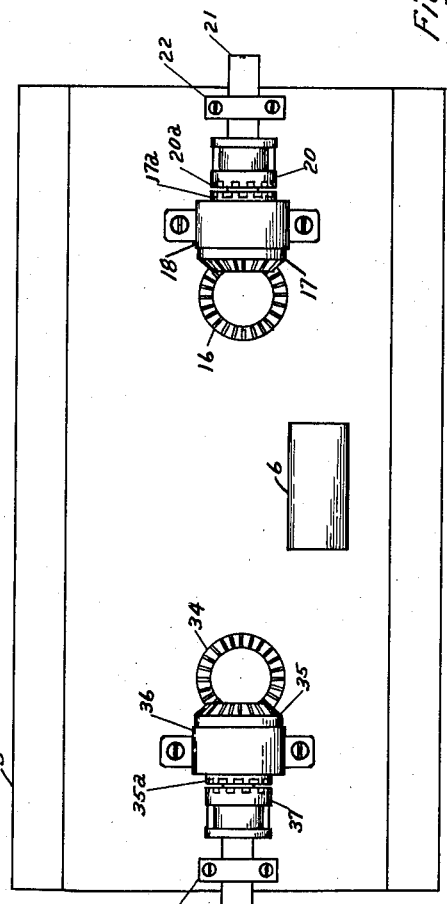

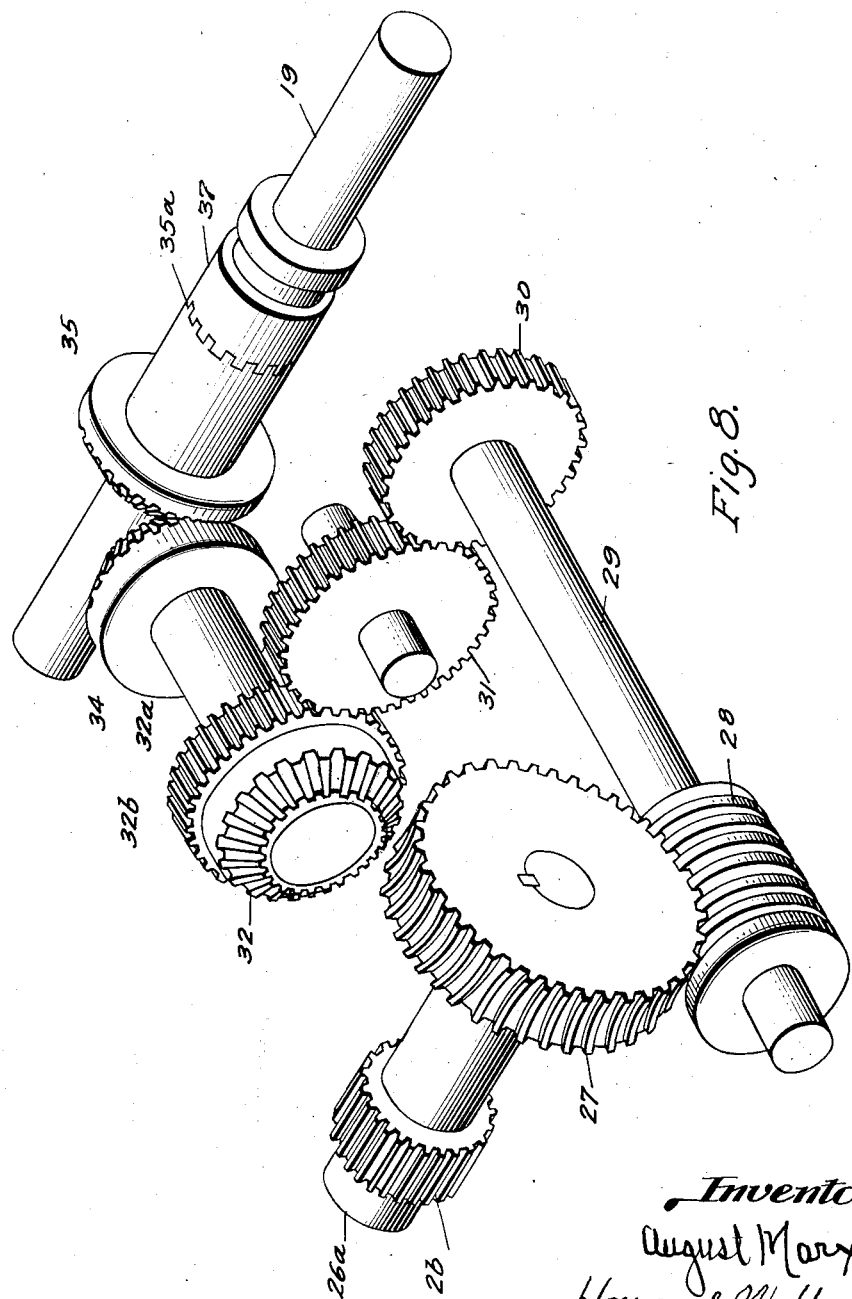

Patented Aug. 21, 1934

1,970,810

UNITED STATES PATENT OFFICE 1,970,810

PLANER

August Marx, Cincinnati, and Howard W. Hunt, Norwood, Ohio, assignors to The G. A. Gray Company, Cincinnati, Ohio Application September 13, 1932, Serial No. 633,008

16 Claims. (Cl. 29—30)

The improvement relates to the attachment of a milling head whereby a milling cutter may be used in a planer. While milling heads have hitherto been attached to planers for the purpose of milling parts of the work when milling was more satisfactory than planing, there have been disadvantages connected with the construction hitherto employed which we avoid. This we do by placing the planer head and the milling head on the same saddle, in such a manner that both are as close to the cross rail or upright as possible, thus adding to the rigidity of the construction. Furthermore, it is necessary to swivel the planer head in planing angular work and it is desirable to be able to swivel the milling head so that angular work may be done by ordinary cutters. Accordingly, we provide means for swiveling both heads. By doing so we are enabled to swivel either one of the heads without interference from the other because when the head to be used is swiveled over into the position in which it is used, the other head may be swiveled to such a position as will avoid interference. This enables us to use a more compact and satisfactory construction. Moreover, by the construction which we use, we are enabled to feed the saddle along the rail to give transverse feed to the planer tool, if it is used, or to the milling cutter, if it is used, and also by the use of a feed rod we can feed the planer tool in a vertical or angular direction, or feed the milling spindle axially from the same feed rod, the construction being such that each feed is independent of the other.

In the drawings, Figure 1 is a front elevation of a double housing planer showing our invention applied to the rail and also to the upright or housing; Figure 2 is a front view of the saddle; Figure 3 is an end view of the saddle looking at it from the right hand side of Figure 1; Figure 4 is a rear view of the saddle with the feed rod removed, but with two clutch members which are slidably keyed to and supported by this feed rod in place; Figure 5 is a vertical section through the planer head on the saddle; Figure 6 is a horizontal section of a portion of the saddle showing the bevel gear and clutches at the rear of the saddle and the slide which moves the clutch; Figure 7 is a partial vertical section of the milling head and saddle showing the spindle and quill and some of the gears which feed the spindle axially; and Figure 8 is a perspective view of the feed mechanism for the milling head with the several members in their proper positions and with the surrounding parts removed.

Referring to the drawings, 1 is the bed of a planer to which are firmly attached uprights 2 and 3. There is a type of planer known as an openside planer, in which only one upright is used. We are describing what is known as a double housing planer, but it will be evident to anyone familiar with the art how our invention may also be applied to an openside planer. To the front of the uprights is clamped a cross rail 4, which acts as a guide member. To this cross rail is slidably gibbed a saddle 5. On the face of the saddle are two cylindrical bosses 5—a and 5—b, the centers of these bosses being a sufficient distance apart so that a planer head may be placed upon one and a milling head be placed upon the other, and still allow both heads to swivel to any usual angle about centers coinciding with the axes of the bosses. It is usual in order to move such a saddle along the rail to affix a nut 6 to the back of it and to provide a rail screw 7 to engage and turn in the nut, altho other means may be and are employed. In the face of the saddle are cut circular T slots 5—c and 5—d concentric respectively with the bosses 5—a and 5—b. Held to the face of the saddle and turning upon one of the bosses is a swivel or harp 8 held in place by harp bolts 9 whose heads engage the T slots in the manner well known in the art. Slidably dovetailed and gibbed to the harp is slide 10 to which is attached in the usual manner a clapper box and clapper for holding cutting tool 11. Journaled in the harp is down feed screw 12 which turns in down feed nut 13 fast to the slide. On down feed screw 12 is miter gear 14 which can be turned by miter gear 15 having a stem 15—a which passes through the boss of the saddle and to which is fastened miter gear 16 which in turn meshes with miter gear 17 which turns in bearing 18 fastened to the back of the saddle. Through this gear passes feed rod 19 and on the end of the hub are cut clutch teeth 17—a which engage clutch teeth 20—a cut on clutch 20 which is slidably keyed to feed rod 19. Clutch 20 may be slid into and out of engagement with the teeth of gear 17 by means of slide 21 which moves in groove 5—e in saddle 5, being held in place by clip 22 and bearing 18. The end of slide 21 is in an accessible position so that the clutch 20 may be engaged or disengaged whenever desired. By turning the feed rod with the clutches engaged, the feed screw 12 will be caused to turn, thus moving the slide along the harp. The construction so far described, except for the second boss and T slot, is not new in the art.

On the other boss is swiveled the body 23 of a milling head. Within this body is a cylindrical quill, 24 having cut on the exterior surface of it rack teeth 24—a. Journaled within the quill is milling spindle 25 which may be driven in any convenient way. Meshing with the rack teeth of quill 24 is pinion 26 cut integral with the shaft 26—a to which is keyed worm wheel 27. Engaging worm wheel 27 is worm 28 turned by shaft 29 to which is affixed gear 30 which meshes with idler 31 which in turn is driven by spur gear teeth 32—b cut on miter gear 32 in the manner shown in Figure 7. This gear is identical in form with miter gear 15 which drives miter gear 14 on the down feed screw 12, the miter gear teeth being adapted to drive miter gear 14 and spur gear teeth to drive idler 31, so that the same gear will drive either the feed mechanism of the planer head or that of the milling head, depending on which head is placed over the boss in which the stem of the miter gear is journaled. The body of the milling head is fastened to the face of the saddle by bolts 33, the heads of which engage with T slot 5—d.

To the stem 32—a of miter gear 32 is fixed miter gear 34 meshing with miter gear 35 which turns in bearing 36 and is concentric with feed rod 19. On the hub of miter gear 35 are cut clutch teeth 35—a with which clutch teeth on clutch 37 may be caused to engage. Clutch 37 is slidably keyed to feed rod 19 and is identical in form and size with clutch 20. Clutch 37 may be slid into and out of engagement with the teeth on miter gear 35 by means of slide 38, which also moves in groove 5—f in saddle 5 and is held in place by clip 39 and bearing 36. The end of slide 38 is in an accessible position so that clutch 37 may be engaged and disengaged whenever desired.

At one point in T slot 5—c is a hole 5—f of just sufficient size so that the head of one of the T slot bolts may be pulled through it when it is in proper position. In like manner, at one point in T slot 5—d is a similar hole 5—g. It will be apparent that by removing the nuts on the T slot bolts, the planer head which includes the harp the slide and other parts affixed thereto, may be removed from the face of the saddle, leaving the T slot bolts in the T slot. These bolts may be removed one at a time by sliding them in the T slot until the head can be pulled through the hole. In like manner, the milling head may be removed from the face of the saddle after taking the nuts off of the T slot bolts 33, and the T slot bolts may then be removed in the manner already described.

Since bosses 5—a and 5—b, upon which the two heads swivel, the T slots 5—c and 5—d, and the miter gears on which are cut miter and spur gear teeth, are severally identical in form and size, it is apparent that it is possible by this construction to place the planer head on either boss, and to give the slide 10 vertical or angular motion by turning the feed rod with the proper clutch engaged, and that the milling head may also be placed on either boss and the spindle given axial motion by turning the feed rod with the proper clutch engaged. Usually, both heads will be placed upon the saddle at the same time, the particular boss on which each head is placed depending on the nature of the work, but either head may be removed and the T slot bolts holding that head also removed. Thus we obtain a construction of great flexibility in use, and make it unnecessary to remove either head in order to use the other unless it is desired to swivel the head to some extreme and unusual angle in which case the other head may be removed to avoid interference.

In certain types of work, such as switch and frog planing, it is not necessary to swivel the planer head, and accordingly the slide is gibbed directly to guiding surfaces machined on the face of the saddle. In case of such a construction, we propose to fasten the milling head to the face of the saddle, beside the slide. Alternatively the body or case 23 of the milling head may be cast integral with the saddle.

It is customary to mount on one or both of the uprights, especially on large planers, a saddle carrying a planer head, in which case the upright acts as a guide member for the saddle. It is evidently possible to make such a saddle somewhat longer than is necessary in order to accommodate a planer head, and to provide it with two bosses in the manner already described. Such a saddle is shown in Figure 1 and upon it are mounted a planer head 41 and a milling head 42. By providing saddle 40 with two bosses and two circular T slots respectively identical in form and size, the planer head and the milling head on this saddle may also be made interchangeable in position, and be swiveled to any reasonable angle without interfering with one another. A milling head may be, and often is, used for performing drilling, reaming, counter-sinking, boring and facing operations, and consequently any head having a rotary spindle for the purpose of performing any of the above or analogous operations, is considered by us to be the equivalent of a milling head. Also, since some types of milling machines may be adapted to do planer work by the addition of a planer head to a saddle carrying a milling head, we do not contemplate restricting our invention to planers only. Moreover, equivalent forms of construction may be substituted for the bosses, T slots, and other parts described, and we therefore claim all forms of construction falling within the scope of the appended claims.

We claim:

1. In a machine tool, a guide member, a saddle slidably gibbed thereto, a planer head adapted to swivel about a center on the face of the saddle, and a milling head adapted to swivel about a second center on the face of the saddle.

2. In a machine tool, a guide member, a saddle slidably gibbed thereto, a planer head adapted to swivel about a center on the face of the saddle, a milling head adapted to swivel about a second center on the face of the saddle, means for clamping the planer head to the saddle in any desired angular position, and means for clamping the milling head to the saddle in any desired angular position.

3. In a machine tool, a guide member, a saddle slidably gibbed thereto, a planer head adapted to swivel about either of two centers on the face of the saddle, means for clamping the planer head to the saddle and adapted for the convenient removal of the planer head that it may be transferred from one center to the other, a milling head adapted to swivel about either of two centers on the face of the saddle, and means for clamping the milling head to the saddle and adapted for the convenient removal of the milling head from the saddle so that it may be transferred from one center to the other.

4. In a machine tool, a guide member, a saddle slidably gibbed thereto, a planer slide slidably gibbed to the face of the saddle, a milling head attached to the saddle adjacent to the planer head, a feed rod, disengageable means for moving the planer slide relatively to the saddle by turning the feed rod, a spindle in the milling head, and disengageable means for moving the spindle axially relatively to the saddle by turning the feed rod.

5. In a machine tool, a guide member, a saddle slidably gibbed thereto, a planer head, including a slide, adapted to swivel on the face of the saddle, a milling head fastened to the face of the saddle adjacent to the planer head, a feed rod, disengageable means for moving the planer head slide relatively to the saddle by turning the feed rod, a spindle in the milling head, and disengageable means for moving the spindle axially relatively to the saddle by turning the feed rod.

6. In a machine tool, a guide member, a saddle slidably gibbed thereto, a planer head including a slide adapted to swivel about a center on the face of the saddle, a milling head adapted to swivel about a second center on the face of the saddle, a feed rod, disengageable means for moving the planer head slide relatively to the saddle by turning the feed rod, a spindle in the milling head, and disengageable means for moving the spindle axially relatively to the saddle by turning the feed rod.

7. In a machine tool, a guide member, a saddle slidably gibbed thereto, a planer head including a slide adapted to swivel about a center on the face of the saddle, a milling head adapted to swivel about a second center on the face of the saddle, means for clamping the planer head to the saddle in any desired angular position, means for clamping the milling head to the saddle in any desired angular position, a feed rod, disengageable means for moving the planer head slide relatively to the saddle by turning the feed rod, a spindle in the milling head, and disengageable means for moving the spindle axially relatively to the saddle by turning the feed rod.

8. In a machine tool, a guide member, a saddle slidably mounted thereon, a head mounted on the face of the saddle, adapted to swivel thereon and to hold a cutting tool in a fixed position with reference to the head while the tool is cutting, and a second head having a power driven rotary spindle, mounted on another part of the face of the saddle and adapted to swivel thereon.

9. In a machine tool, a guide member, a saddle slidably mounted thereon, a head mounted on the face of the saddle, adapted to swivel thereon and to hold a cutting tool in a fixed position with reference to the head while the tool is cutting, and a second head having a power driven rotary spindle, mounted on another part of the face of the saddle and adapted to swivel thereon, the said heads being each removable and also interchangeable in position.

10. In a machine tool, a guide member, a saddle slidably mounted thereon, a head mounted on the face of the saddle and adapted to hold a cutting tool in a fixed position with reference to the head while the tool is cutting, a second head having a power driven rotary spindle and mounted on another part of the face of the saddle adjacent to the first head, a feed rod, and disengageable means, one for each head, for feeding either head or both heads by turning the feed rod.

11. In a machine tool, a guide member, a saddle slidably mounted thereon, a head for holding a planer tool mounted on the face of the saddle and adapted to swivel thereon, a second head having a power driven rotary spindle, mounted on another part of the face of the saddle and adapted to swivel thereon, a feed rod, and disengageable means, one for each head, for feeding either head or both heads, by turning the feed rod.

12. In a machine tool, a guide member, a saddle slidably gibbed thereto, a planer slide slidably gibbed to the face of the saddle, a quill axially movable in a hole bored in the saddle, a spindle journaled in the quill, a fed rod, disengageable means for moving the planer slide relatively to the saddle by turning the feed rod, and disengageable means for moving the spindle axially relatively to the saddle by turning the feed rod.

13. In a machine tool, a guide member, a saddle slidably gibbed thereto, a planer slide slidably gibbed to the face of the saddle, a body fixed to the face of the saddle, a quill axially movable in a hole bored in the body, a spindle journaled in the quill, a feed rod, disengageable means for moving the planer slide relatively to the saddle by turning the feed rod, and disengageable means for moving the spindle axially relatively to the saddle by turning the feed rod.

14. In a machine tool, a guide member, a saddle slidably gibbed thereto, a planer head adapted to swivel on the face of the saddle, a quill axially movable in a hole bored in the saddle, a spindle journaled in the quill, a feed rod, disengageable means for moving the planer slide relatively to the saddle by turning the feed rod, and disengageable means for moving the spindle axially relatively to the saddle by turning the feed rod.

15. In a machine tool, a guide member, a saddle slidably gibbed thereto, a planer head adapted to swivel on the face of the saddle, a case fixed to the face of the saddle, a quill axially movable in a hole bored in the case, a spindle journaled in the quill, a feed rod, disengageable means for moving the planer slide relatively to the saddle by turning the feed rod, and disengageable means for moving the spindle axially relatively to the saddle by turning the feed rod.

16. In a machine tool, a guide member, a saddle slidably mounted thereon, a first head including a slide mounted on the face of the saddle and adapted to hold a cutting tool in a fixed position with reference to the saddle while the tool is cutting, a second head also mounted on the face of the saddle including a power driven spindle rotatably mounted in a quill axially movable in a hole bored in the head, a feed rod, disengageable means for moving the slide relatively to its head by turning the feed rod, and disengageable means for moving the spindle axially relatively to its head by turning the feed rod.

AUGUST MARX.
HOWARD W. HUNT.